W. HOWARTH.
NUT LOCK.
APPLICATION FILED DEC. 15, 1920.
1,397,808. Patented Nov. 22, 1921.
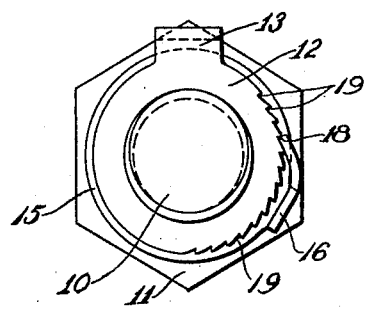
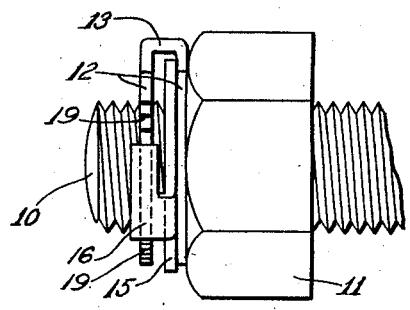
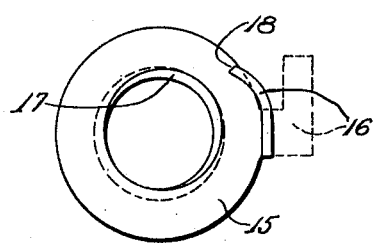
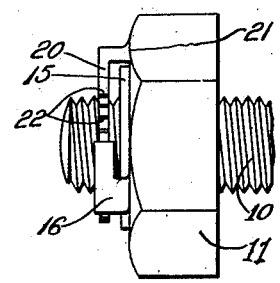
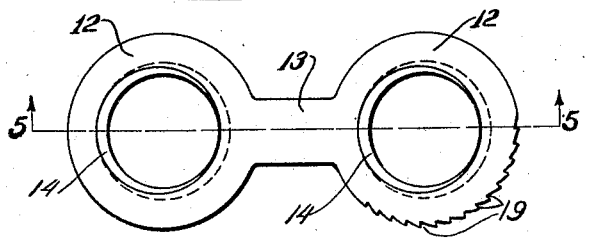
INVENTOR
William Howarth.
BY
G. H. Braddock
ATTORNEY

UNITED STATES PATENT OFFICE.

WILLIAM HOWARTH, OF DEVON, CONNECTICUT.

NUT-LOCK.

1,397,808.  Specification of Letters Patent.  Patented Nov. 22, 1921.

Application filed December 15, 1920. Serial No. 431,027.

*To all whom it may concern:*

Be it known that WILLIAM HOWARTH, a citizen of the United States, and resident of Devon, in the county of New Haven and State of Connecticut, has invented certain new and useful Improvements in Nut-Locks, of which the following is a specification.

The object of the present invention is to provide a novel and improved nut lock which will be simple in construction and cheap to manufacture, and will at the same time be adapted to effectually prevent nuts from working loose upon their bolts.

With the above and other objects in view, the invention comprises the construction, arrangement and combination of parts now to be fully described and hereinafter specifically claimed.

In the accompanying drawing forming a part of this specification,

Figure 1 is an end view of a bolt having a nut and showing the device of the invention locked thereagainst;

Fig. 2 is a side elevation corresponding with the showing of Fig. 1;

Fig. 3 is a plan view of a blank for making the locking washer of the improved device;

Fig. 4 is a plan view of a blank for making the double gripping washer;

Fig. 5 is a sectional view on line 5—5 in Fig. 4; and

Fig. 6 is a side elevation corresponding with Fig. 2, but showing a modified form of nut lock made in accordance with the principles of the invention.

In said drawing, 10 denotes a bolt and 11 a nut thereon. The nut lock of the invention is adapted to bear against one face of the nut to preclude its working off of the bolt, and comprises, broadly, as it is shown in Figs. 1 to 5, inclusive, a double gripping washer and a locking washer associated therewith.

Referring more particularly to Figs. 4 and 5, the double gripping washer may be a stamping consisting of two ring portions 12 connected by a web 13. In constructing the nut lock the blank may be bent through the web until the ring portions are parallel with each other and spaced a slight distance apart. The ring portions may then be tapped, as suggested by numeral 14, in any desired manner and so that the double gripping washer as a whole will smoothly ride upon the thread of a bolt of suitable size.

The locking washer may be a stamping consisting of a disk 15 having a preferably L-shaped lug 16. The locking washer is also tapped, as suggested by numeral 17, and the opening of this ring must be the approximate size of those of the ring portions of the gripping washer.

As very clearly shown in Fig. 2, the locking washer is in use arranged between the ring portions of the gripping washer. That is to say, the bolt passes through said ring portions and said locking washer, and the locking washer is arranged upon that portion of the thread of the bolt that is between the ring portions of the gripping washer.

In preparing the locking washer for its purpose, the L-shaped lug is bent from the position shown in dotted lines in Fig. 3 to about that shown in full lines, so that the outer end 18 of said lug may engage serrations 19 made upon the edge of one of the ring portions when said washers are assembled to form a nut lock. As is obvious, these serrations are so arranged that when the lug is in engagement with one of them and the gripping washer is turned in right hand direction to ride forwardly upon the thread of the bolt, the locking washer will ride with it. As is also obvious, the lug provides a spring engagement between the locking washer and serrations, so that when the gripping washer has been tightened down against the nut, the locking washer may be turned still further forwardly.

The nut lock functions in the following manner: The locking washer is arranged between the ring portions of the gripping washer so that its opening is in alinement with the openings of said ring portions and so that its lug is spring pressed against one of the serrations in a ring portion. The gripping washer is then screwed onto a bolt until one of its ring portions is in firm engagement with a face of a fastened down nut. The locking washer will at this time turn with the gripping washer. The locking washer is then turned forwardly, the spring lug riding over the serrations, until it is in firm engagement with that ring portion of the gripping washer bearing against the nut. It is so shown in Figs. 1 and 2. As is evident, the locking washer cannot turn rearwardly from this position for the reason that the lug has seated itself behind a different serration.

In Fig. 6 I have disclosed a modified form of the invention, wherein a single ring portion 20 having a tapped opening is integrally carried by the nut as denoted by numeral 21. This ring portion is provided with serrations 22 adapted to be engaged by the lug of a similar locking washer. As the nut is fastened down, the ring portion and locking washer turn with it. The locking washer may then be turned forwardly and the lug will seat itself behind one of the serrations as before.

What I desire to claim is:

1. A nut lock comprising a double gripping washer consisting of a pair of parallel ring portions connected by a web and provided with alining openings, a locking washer consisting of a disk having an opening, said disk and gripping washer having independent rotary movements and said disk adapted to be arranged between said ring portions so that all of said openings are in alinement, and coöperating means carried by said gripping washer and disk whereby they can be locked to each other.

2. A nut lock comprising a double gripping washer consisting of a pair of parallel ring portions connected by a web and provided with alining openings, a locking washer consisting of a disk having an opening, said disk adapted to be arranged between said ring portions so that all of said openings are in alinement, serrations upon said gripping washer, and a lug extending from said disk and adapted to engage said serrations, whereby said disk and gripping washer can be locked to each other.

3. A nut lock comprising a double gripping washer consisting of a pair of parallel, tapped ring portions connected by a web, a locking washer consisting of a tapped disk, said disk adapted to be arranged between said ring portions whereby said nut lock can be placed upon a bolt, serrations arranged upon the edge of one of said ring portions, and a spring lug carried by said disk and adapted to engage said serrations, whereby said washers can be locked together to turn with each other to cause one of said ring portions to engage a nut upon said bolt, and said locking washer can be turned further upon said bolt to be locked against said last mentioned ring portion.

4. A nut lock including tapped ring portions and a tapped disk therebetween, said ring portions and disk adapted to be arranged upon a bolt, serrations upon the edge of one of said ring portions, and a spring lug on said disk and adapted to engage said serrations, whereby said ring portions and disk may be locked together to turn forwardly and said disk may turn further forwardly when said ring portions have been brought to rest upon said bolt.

Signed at Bridgeport, in the county of Fairfield and State of Connecticut, this 9th day of December, A. D. 1920.

WILLIAM HOWARTH.